United States Patent [19]

Phillips et al.

[11] Patent Number: 5,716,166

[45] Date of Patent: Feb. 10, 1998

[54] OFFSHORE RETROFIT OF BARGE BUMPER SYSTEMS

[75] Inventors: Darron J. Phillips, Arlington; William J. Eldridge, Grand Prairie; Larry V. Spalding, Fort Worth, all of Tex.

[73] Assignee: Continental EMSCO Co., Houston, Tex.

[21] Appl. No.: 770,420

[22] Filed: Dec. 20, 1996

Related U.S. Application Data

[63] Continuation of Ser. No. 504,897, Jul. 20, 1995, abandoned.

[51] Int. Cl.$^6$ ............................................. F16L 1/00
[52] U.S. Cl. ............................................. 405/211
[58] Field of Search ............................ 405/211, 212, 405/216

[56] References Cited

U.S. PATENT DOCUMENTS

| | | | |
|---|---|---|---|
| 3,564,858 | 2/1971 | Pogonowski | 61/48 |
| 3,991,582 | 11/1976 | Waldrop et al. | 61/48 |
| 3,995,437 | 12/1976 | Drewett | 61/86 |
| 4,005,672 | 2/1977 | Files | 114/219 |
| 4,098,211 | 7/1978 | Files et al. | 114/219 |
| 4,109,474 | 8/1978 | Files et al. | 61/48 |
| 4,109,480 | 8/1978 | Sumner | 405/170 X |
| 4,273,473 | 6/1981 | Thomerson et al. | 405/212 |
| 4,311,412 | 1/1982 | Guilbeau | 405/212 |
| 4,338,046 | 7/1982 | Thomerson | 405/212 |
| 4,363,474 | 12/1982 | Leblanc et al. | 267/140 |
| 4,408,931 | 10/1983 | Leblanc et al. | 405/213 |
| 4,411,556 | 10/1983 | Leblanc et al. | 405/213 |
| 4,477,302 | 10/1984 | Leblanc et al. | 156/165 |
| 4,478,536 | 10/1984 | Drewett et al. | 405/213 |
| 4,516,882 | 5/1985 | Brewer et al. | 405/224 |
| 4,571,123 | 2/1986 | Chandra et al. | 405/212 |
| 4,607,586 | 8/1986 | Taquino | 114/219 |
| 4,662,791 | 5/1987 | Spicer | 405/212 |

(List continued on next page.)

FOREIGN PATENT DOCUMENTS 1088867  10/1967  United Kingdom ............ E02B 3/22

OTHER PUBLICATIONS

Hercu–Link Trolley Mount 5–50 Metric Ton Lifting Capacity, Air Chain Hoists, Ingersol-Rand, 3 pages.
The Regal Defender™ Test Results, Regal Marine Products, East Highway 31, Corsicana, Texas, 75110, 6 pages.
Installation Procedure for Regal International, Inc. "Defender" System, Regal International Inc., Corsicana, Texas, 11 pages.
Regal "Defender" Installation Procedure, Steps I to IX, Regal International Inc., Corsicana, Texas, 75110, 9 pages.
E.P.I. Energy Absorbing Products by Design, EPI Incorporated, 1112 Hugh Wallis Road, Lafayetter, Louisiana 77508, 4 pages.
Energy Cells, Teledyne Monarch Rubber, Energy Products Div., 10 Lincoln Park, Hartville, Ohio 44632, Nov. 82, 8 pages.
Regal Bumper Systems, Regal International Inc., Corsicana, Texas, 75110, 2 pages.
"Bandit and Cell Mate", Offshore Kinematics, Inc., 7102 Chippewa Blvd., Houston, Teas 77086, 4 pages

*Primary Examiner*—William P. Neuder
*Attorney, Agent, or Firm*—Arnold, White & Durkee

[57] ABSTRACT

A method of retrofitting an offshore platform fendering system includes the steps of installing a jib crane on a platform leg above the existing fendering system, detaching the upper and lower load cells from the leg, and removing the existing fendering system using the jib crane in concert with a support vessel crane. The upper load cell of the existing fendering system is detached to leave a protruding cylindrical stub. Using the jib crane and vessel crane, a new unitary fendering system is then positioned next to the leg. The upper load cell is coupled to the stub and the lower load cell is clamped to the leg. The new fendering system is installed as a unitary piece, that is, an elongated bumper with the upper and lower load cells already attached.

25 Claims, 8 Drawing Sheets

U.S. PATENT DOCUMENTS

| | | | |
|---|---|---|---|
| 4,697,956 | 10/1987 | Plaisance | 405/213 |
| 4,715,310 | 12/1987 | Curtis et al. | 114/220 |
| 4,782,961 | 11/1988 | Länge | 254/900 X |
| 4,784,529 | 11/1988 | Hunter | 405/227 |
| 4,883,387 | 11/1989 | Myers et al. | 405/195 |
| 4,907,914 | 3/1990 | Gunderson et al. | 405/224 |
| 5,012,875 | 5/1991 | Casbarian et al. | 405/211 X |
| 5,324,141 | 6/1994 | Hunter et al. | 405/223.1 |

5,716,166

OFFSHORE RETROFIT OF BARGE BUMPER SYSTEMS

This application is a continuation of application Ser. No. 08/504.897, filed on Jul. 20, 1995, now abandoned.

BACKGROUND OF THE INVENTION

1. Field of the Invention

This invention relates generally to methods for installing barge bumper systems, otherwise known as fendering systems, on offshore platforms, and in particular to a method for retrofitting a fendering system to an offshore platform wherein the fendering system is installed as a one piece unit without the need for construction of a cofferdam.

2. Description of the Related Art

During their construction and throughout their working lifetimes, offshore platforms require a certain level of sea traffic. Service vessels and barges routinely ferry equipment, supplies, and other necessities to and from the platforms. Depending upon the sea and weather conditions, and the skill of the vessel pilot, the docking of these vessels can result in potentially damaging collisions to the platform legs. There is also the ongoing risk of accidental collisions. Accordingly, protecting offshore platforms from potentially damaging collisions is desirable.

For a number of years fendering system systems have been used on offshore platforms to dampen the impact energy transmitted from a vessel to the platform legs during collisions. The fendering system systems have historically consisted of some type of vertically disposed elongated contact post or bumper that is coupled to the platform leg by one or more load cells. The load cells typically contain some type of elastomeric member that acts as a shock absorber. The vertically disposed bumper prevents an approaching vessel from directly impacting the platform leg and will absorb the impact energy of a collision with the vessel, transmitting the energy therefrom into the load cells where the majority of the energy is transformed from kinetic energy to, and stored as, potential energy. The transformation of kinetic energy to potential energy reduces the reaction force on the platform leg and impacting vessel thereby minimizing damage to both.

For a variety of reasons, offshore fendering system systems have historically had finite life spans. Accidental collisions, ordinary impacts, wave action, metal corrosion, and degradation of the elastomeric components in the load cells lead to an eventual failure of the offshore fendering system. When the fendering system systems fail, the platform cannot be towed to land for installation of new fendering systems. Consequently, the replacement must be done at sea.

Historically, the replacement of an offshore boat fender system has required sophisticated and costly retrofit procedures. A number of factors contribute to the cost and complexity of current retrofit procedures. First, most offshore fendering systems are ordinarily installed on the platform legs component by component before the platform is transported to its final destination offshore. As a consequence, the current methods of replacing an existing fendering system typically calls for the construction of a cofferdam around the submerged fendering system to facilitate the installation of numerous components in a relatively water and wave free environment. A cofferdam may also be necessary if undersea welding operations are necessary. Second, the configuration of most offshore platforms makes most offshore fendering systems inaccessible to cranes positioned on the platform deck. Consequently, the cofferdam construction, existing fendering system demolition, and new fendering system installation depend almost exclusively on a support vessel crane for lifting capability. In high seas, the ability of the support vessel to facilitate the cofferdam installation and fendering system demolition and installation may be hampered, and large swells may wash water into the cofferdam making it difficult to maintain a dry work environment.

The present invention is intended to overcome or minimize one or more of the foregoing disadvantages.

SUMMARY OF THE INVENTION

In one aspect of the present invention, a method is provided for removing an existing fendering system from a leg of an offshore platform and replacing it with a new fendering system with the assistance of a support vessel equipped with a crane. According to the method, a jib crane is coupled to the leg above the existing fendering system. The jib crane has a lifting cable. A first upper load cell of the existing fendering system is detached from the leg. The first upper load cell is attached to the leg at a first preselected position. A first lower load cell of the existing fendering system is detached from the leg. The first lower load cell is attached to the leg at a second preselected position. By means of the crane, the existing fendering is removed. By means of the crane, the new fendering system is placed proximate the leg. The new fendering system includes an elongated cylindrical bumper, a second upper load cell coupled to the bumper, and a second lower load cell coupled to the bumper in spaced relation to the second upper load cell. By means of the jib crane, the new fendering system is raised to position the second upper load cell at the first preselected position and to position the second lower load cell at the second preselected position. The second upper load cell and the second lower load cell are then coupled to the leg.

In another aspect of the present invention, a jib crane adapted to be coupled to a leg of an offshore platform for replacement or maintenance of an existing fendering system is provided. The jib crane includes a generally horizontally disposed boom pivotally coupled to the leg such that the boom is operable to selectively pivot in a horizontal plane. A hoist is rollably coupled to the boom. The hoist has a vertically moveable hook that is operable to lift objects. The hoist is operable to translate along the boom.

BRIEF DESCRIPTION OF THE DRAWINGS

Other objects and advantages of the invention will become apparent upon reading the following detailed description and upon reference to the drawings in which:

FIG. 1A illustrates a top view of the arrangement of FIG. 1;

DESCRIPTION OF THE PREFERRED EMBODIMENTS

Figure 1:
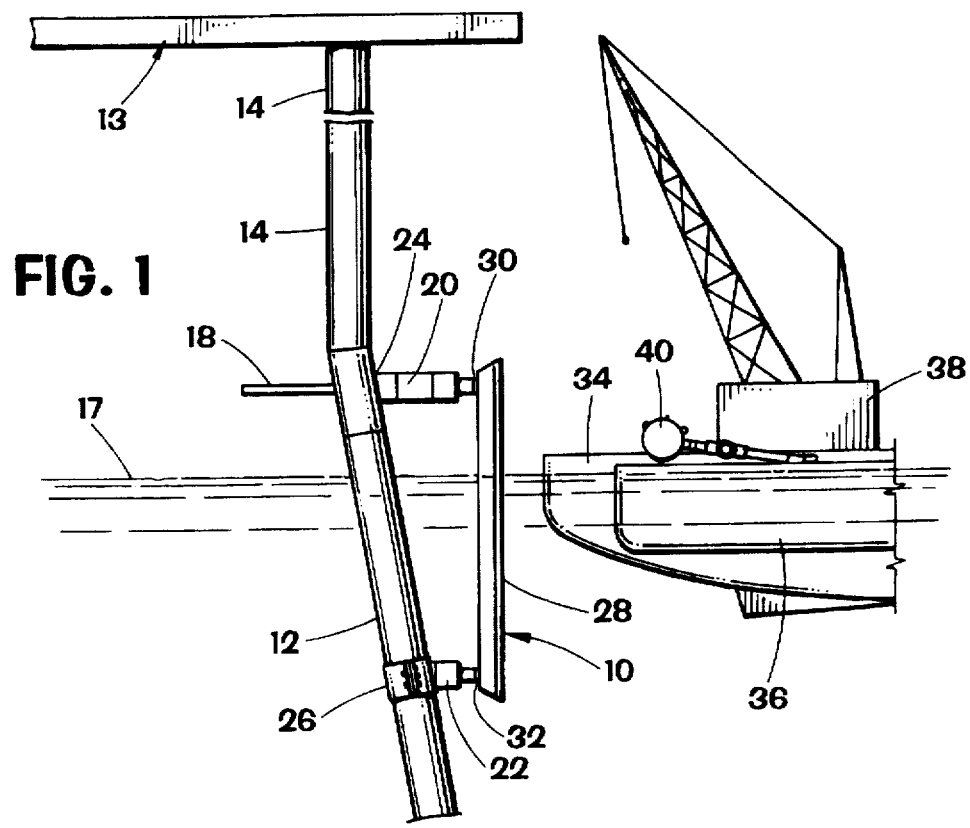
FIG. 1 illustrates a side view of an existing fendering system.

Referring now to the drawings, and, in particular to FIG. 1, there is shown an existing fendering system 10 that is coupled to one leg 12 of an offshore platform 13. It should be understood that a typical offshore platform has four or more of such legs 12 and, accordingly, a complimentary number of existing fendering systems 10. However, for simplicity of illustration replacement of only one existing fendering system 10 is discussed. The leg has a relatively vertically disposed upper portion 14 and an angularly disposed lower section 16. The upper end of the lower section 16 is connected to a spider deck 18 on the platform (not shown). In FIG. 1 and where applicable in the other figures, the mean water line is indicated at 17.

The existing fendering system includes an upper load cell 20 coupled to the upper end of the lower leg 16 and a lower load cell 22 coupled to the lower end of the lower section 16. The upper load cell 20 is typically an elongated cylindrical member that is typically welded to the upper end of the lower section 16 at 24. The lower load cell 22 is also a generally cylindrical member that may be either welded to the lower end of the lower section 16 or, as shown in FIG. 1, or attached to the lower end of the lower section 16 by a bolted clamp 26. The structure and function of the upper and lower load cells 20 and 22 will be described in more detail below. A relatively vertically disposed bumper 28 is coupled at its upper end 30 to the upper load cell 20 and at its lower end 32 to the lower load cell 22. The bumper 28 is a generally cylindrical elongated tubular member that may or may not contain an elongated cylindrical elastomeric member (not shown) as discussed more fully below.

FIG. 1 shows a partial stern view of a typical support vessel 34 and a support barge 36 anchored next to the existing fendering system 10. FIG. 1A shows a top view of the arrangement of FIG. 1. The support vessel 34 has a lifting crane 38 fixed to its deck. A jib crane 40, the structure and function of which will be described more fully below, is temporarily disposed on the support barge 36. It should be understood that the retrofit operation may be carried out with a single vessel that is equipped with a crane and that is large enough to transport the existing fendering system 10.

Figure 2:
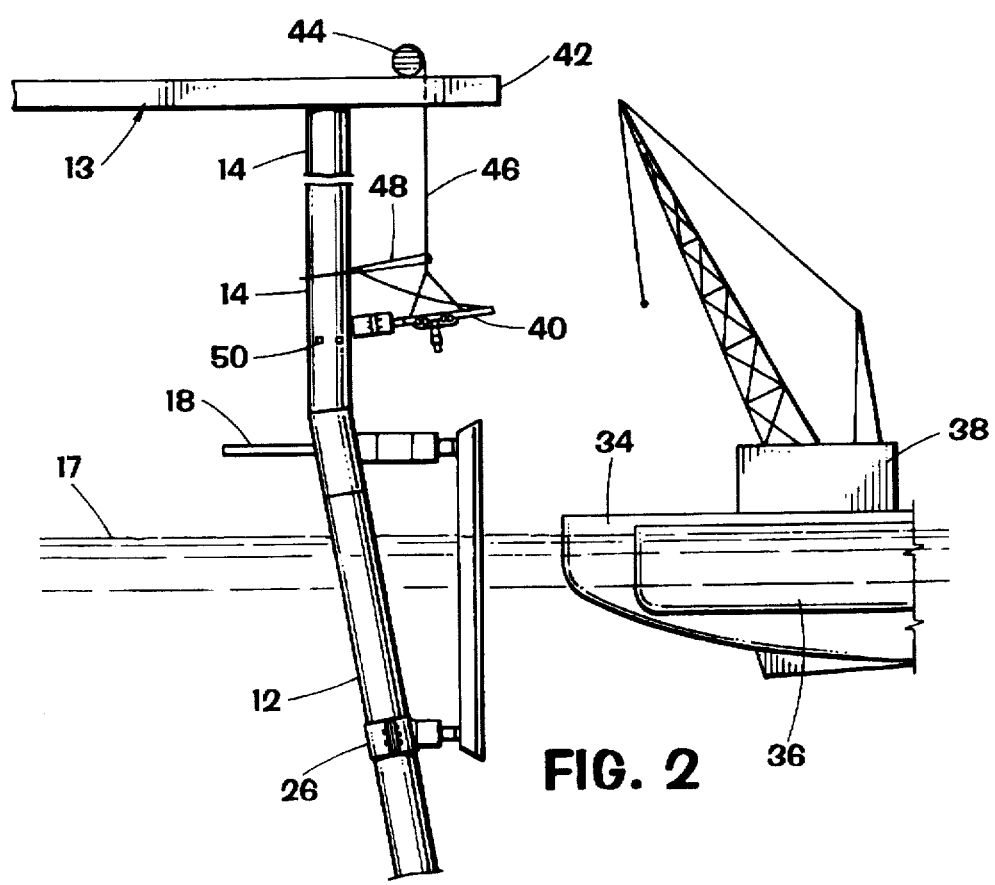
FIG. 2 illustrates a side view of an existing fendering system, showing the installation of a jib crane.
Figure 1:
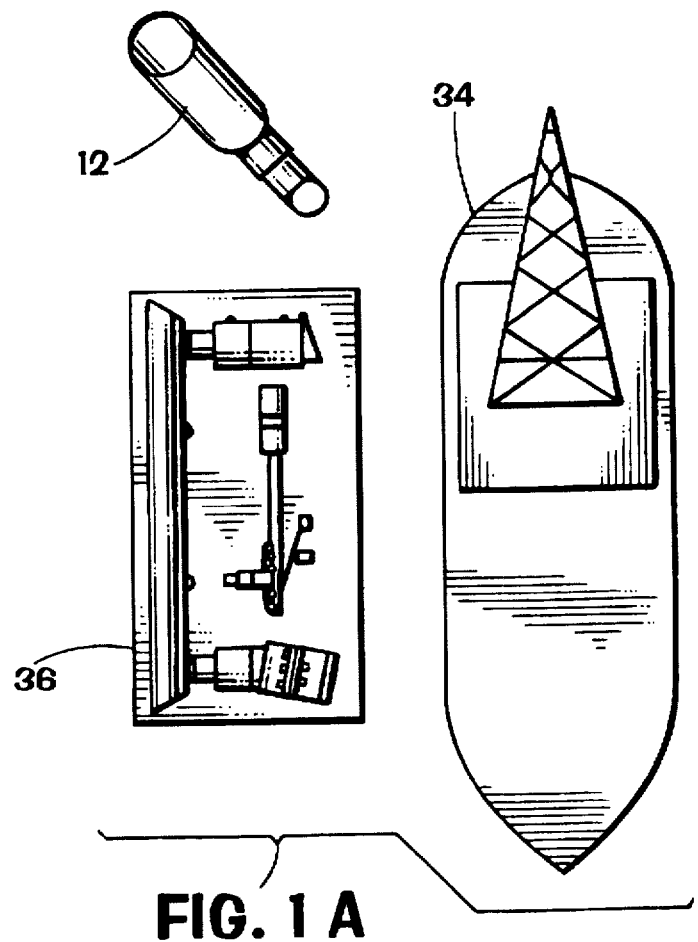

The removal of the existing fendering system is illustrated in FIGS. 2–6, inclusive. FIG. 2 depicts the leg 12 and existing fendering system 10 disposed below a typical upper deck 42 of the platform 13. The first step in retrofitting the platform 13 with a new fendering system is to remove the existing fendering system 10. The portable jib crane 40 is lifted from the deck of the support barge 36 by the crane 38 to an elevated position where it is coupled to a winch 44 that is disposed on the upper deck 42. The jib crane 40 is attached to the winch 44 by a cable 46 that extends down through the upper deck 42. The jib crane 40 is temporarily held in an elevated position proximate the upper end of the upper section 14. A tag line 48 is slung around the cable 46 to provide for azimuth adjustments of the jib crane 40. A lower stop 50 for the jib crane 40 is weld or otherwise coupled to the exterior of the upper section 14 of the leg 12. The stop 50, depicted in FIG. 2 as a pair of lugs welded to the exterior of the upper section 14 of the leg 12, is designed to define the lower limit of vertical movement of the jib crane 40, and accordingly may be any of a variety of shaped members that protrude outward from the exterior of the upper section 14 of the leg 12. The jib crane 40 provides a significant lifting capability that is independent of the platform cranes and the effects of wave action that may hamper the support vessel crane 38.

Figure 3:
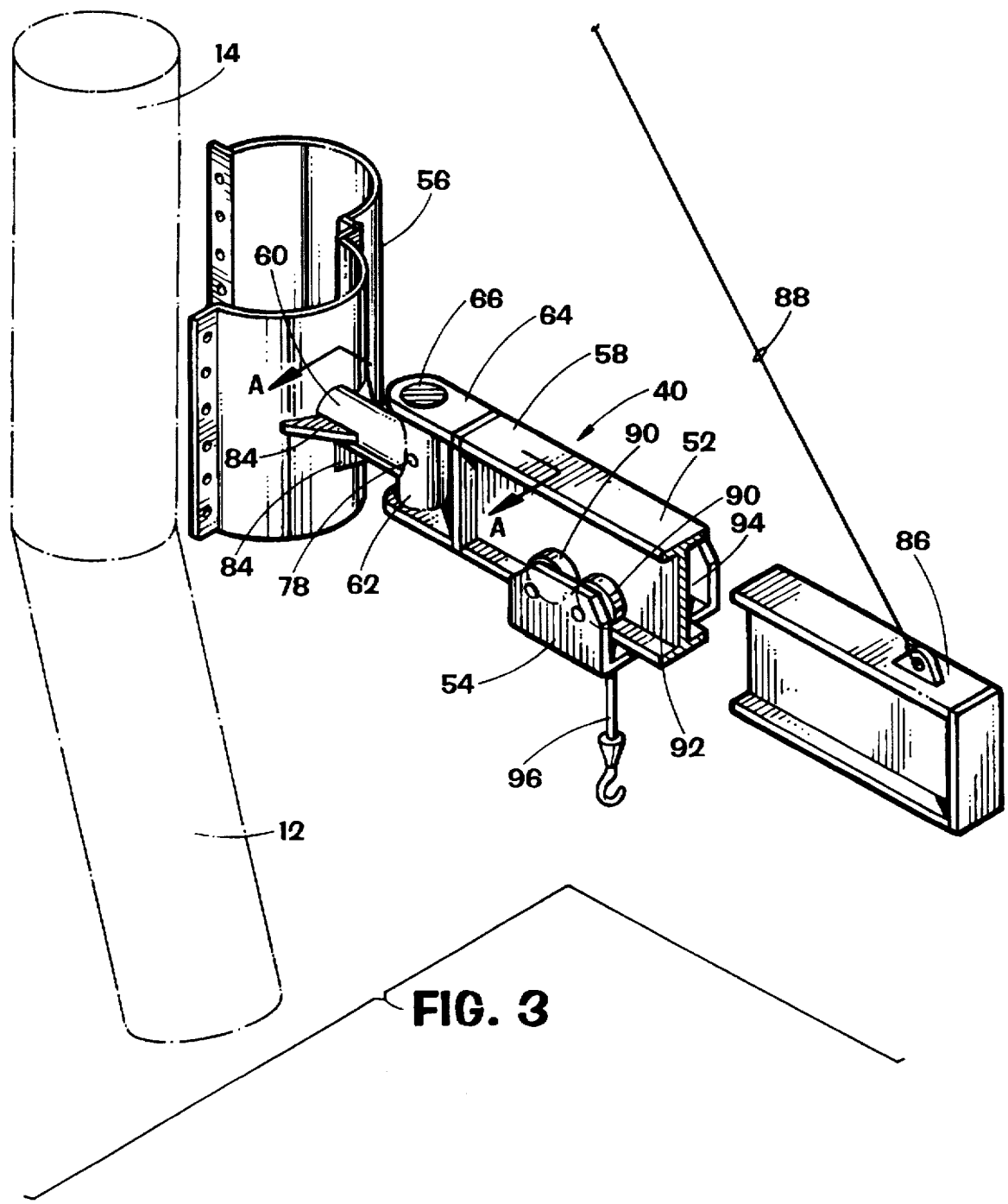
FIG. 3 illustrates a pictorial view of the jib crane.
Figure 4:
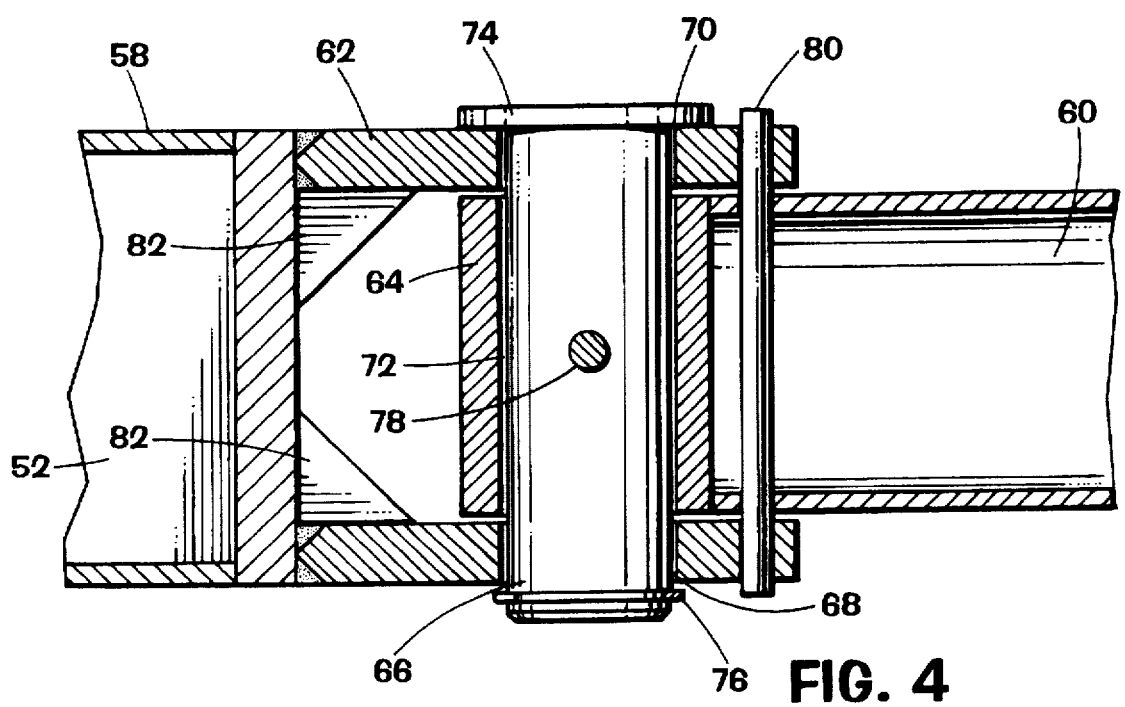
FIG. 4 illustrates a partial sectional view of the jib crane of FIG. 3, taken at A—A.

Referring now also to FIGS. 3 and 4, which are, respectively, a pictorial view of the jib crane 40 just prior to installation on the upper section 14 of the leg 12 (shown in phantom) and a partial sectional view of FIG. 3 taken at section A—A, the jib crane 40 includes a horizontally disposed boom 52, a motorized hoist 54 rollably disposed on the boom 52, and a three piece cylindrical clamp 56 that is designed to secure about the upper section 14 of the leg 12. The inboard end 58 of the boom 52 is pivotally coupled to a cantilever member 60, that is, in turn, coupled to the three piece clamp 56. The pivotal coupling between the cantilever member 60 and the inboard end 58 of the boom 52 consists of a tongue and fork connection. A fork 62 is welded or otherwise connected to the boom 52. A tongue 64 is welded or otherwise connected to the cantilever member 60. The tongue 64 is disposed within the fork and pivotally held in place therein by a vertically disposed pivot pin 66 that is journaled through concentric openings 68 and 70 in the fork 62 and 72 in the tongue 64. The pivot pin 66 has at its upper end a circular flange 74 that is larger in diameter than the opening 70 to prevent the pivot pin 66 from falling therethrough. A locking ring 76 is peripherally disposed around the lower end of the pivot pin 66 to prevent the pivot pin 66 from popping up through the openings 68, 70, and 72.

When the jib crane 40 is in operation, the boom 52 will ordinarily be locked in the position shown in FIG. 3 by a locking pin 78 that is journaled through the tongue 64 and the pivot pin 66 and/or by a vertically disposed locking pin 80 that is journaled through the fork 62 and the cantilever member 60.

Two or more triangular gussets 82 are welded into the end of the fork 62 that is coupled to the boom 52. The cantilevered member 60 is welded or otherwise connected to the three piece clamp 56 and supported thereon by one or more circumferentially spaced triangular gussets 84.

The outboard end 86 of the boom 52 is connected to the upper section 14 of the leg 12 by a support chain 88. The support chain 88 is put into position and coupled to the upper section 14 and the outboard end 86 of the boom 52 after the jib crane 40 is clamped to the upper section 14.

The boom 52 preferably has an I-beam construction such that the rollers 90 of the hoist 54 are rollably disposed in parallel channels 92 and 94. The hoist 54 is operable to both translate back and forth along the boom 52 as well as raise and lower a lifting cable 96. The rollers 90 and winch 44 may be powered either pneumatically, electrically, or hydraulically, or some combination thereof. A preferred hoist is an HA1 series manufactured by Ingersoll-Rand, or a similar hoist.

Figure 5:
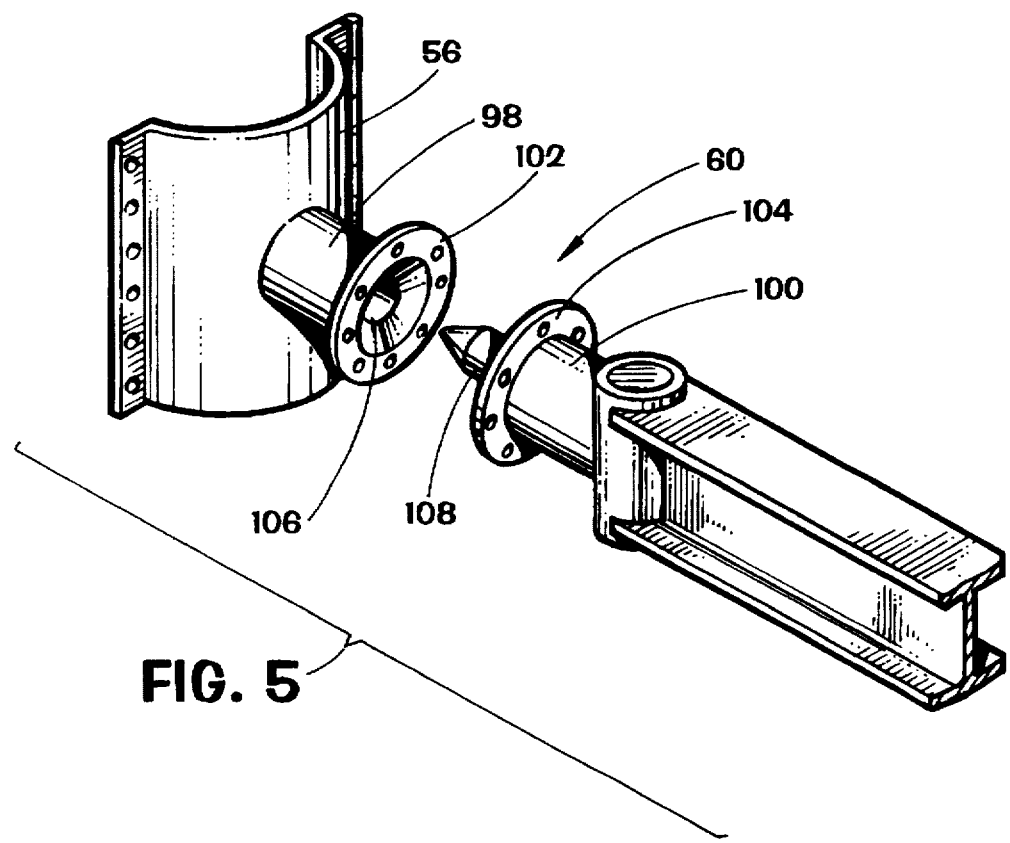
FIG. 5 illustrates an alternate embodiment of the jib crane of FIG. 3.

FIG. 5 depicts an alternate preferred embodiment of the cantilevered member 60. In this preferred embodiment, the cantilevered member 60 is divided into an inboard portion 98 and an outboard portion 100. The inboard portion 98 is welded or otherwise connected at one end to the three piece clamp 56 and the other end terminates in a flange 102 adapted for bolt connection to an identical flange 104 on one end of the outboard portion 100. The inboard and outboard portions 98 and 100 are intended to be joined in a stabbing movement. To facilitate that stabbing movement, the flange 102 has a central inwardly tapering female opening 106 that is adapted to receive a tapered nipple 108 projecting away from the flange 104. Once the stabbing movement has occurred, the flanges 102 and 104 are bolt connected. In all other respects, the cantilevered member 60 is identical to the aforementioned embodiment.

Figure 6:
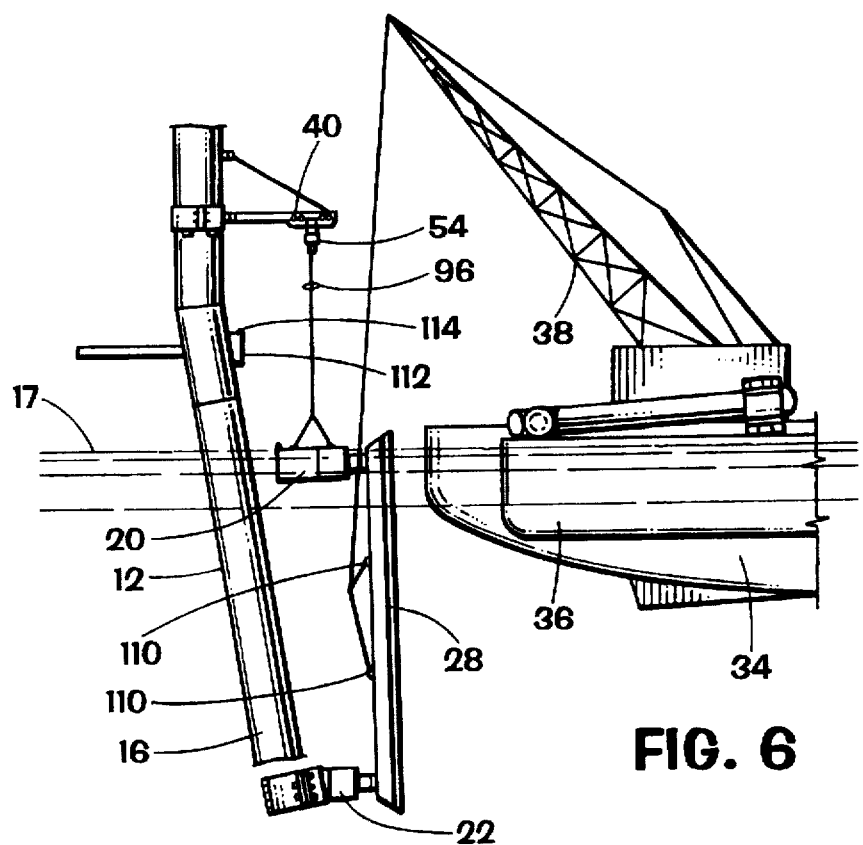
FIG. 6 illustrates a side view of an existing fendering system upon removal from the platform leg.

Referring now also to FIG. 6, which illustrates the removal of the existing fendering system 10, following installation of the jib crane 40, the hoist 54 is actuated to lower the lifting cable 96 down to the upper load cell 20. The lifting cable 96 is coupled to the upper load cell 20. In addition, the crane 38 on the support vessel 34 is coupled to the bumper 28 at one or more contact points 110. The lower load cell 22 is then disconnected from the lower section 16 of the leg 12. If the lower load cell 22 was coupled to the lower section 16 by a bolt clamp, this step will entail simply removing the bolts. If, however, the lower load cell 22 was welded to the lower section 16, the lower load cell 22 would have to be cut from the lower section 16.

Figure 7:
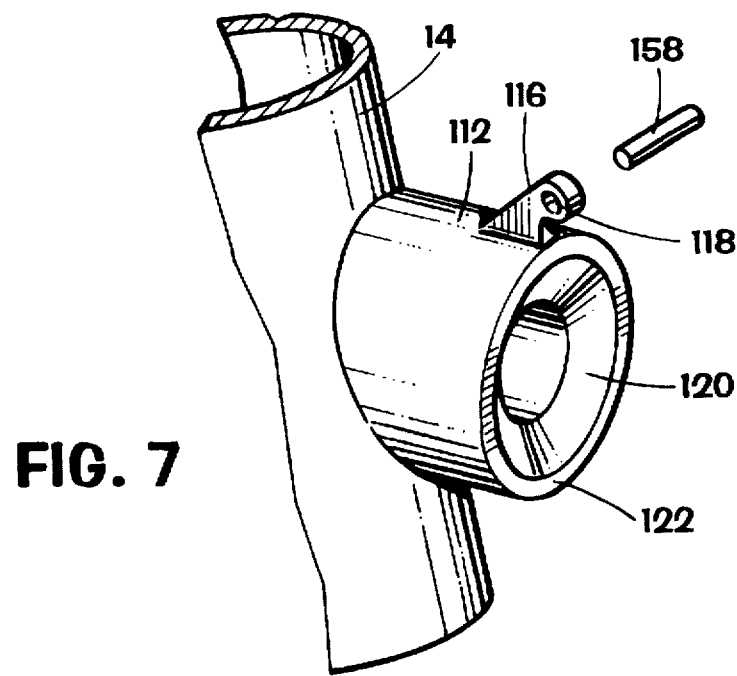
FIG. 7 illustrates a pictorial view of the stub and a portion of the platform leg following preparation of the stub for installation of a new fendering system.

After the lower load cell 22 is removed from the lower section 16, the upper load cell is severed, by cutting torch or other cutting methods, from the upper end of the lower portion 16, leaving a portion of the upper load cell 20 as a generally hollow and cylindrical stub 112. To prepare the stub 112 for reception of a new fendering system, a fastening lug 114 is coupled to the outboard side edge of the stub 112. The lug 114 is typically a flange 116 with a hole 118 bored therethrough as shown in FIG. 7, which is a pictorial view of the stub 112. To facilitate coupling with the upper load cell of the new bumper system, a circular tapered surface 120 is cut in the interior of the rim 122 of the stub 112. The tapered surface 120 is shown highly exaggerated in FIG. 7.

Figure 8:
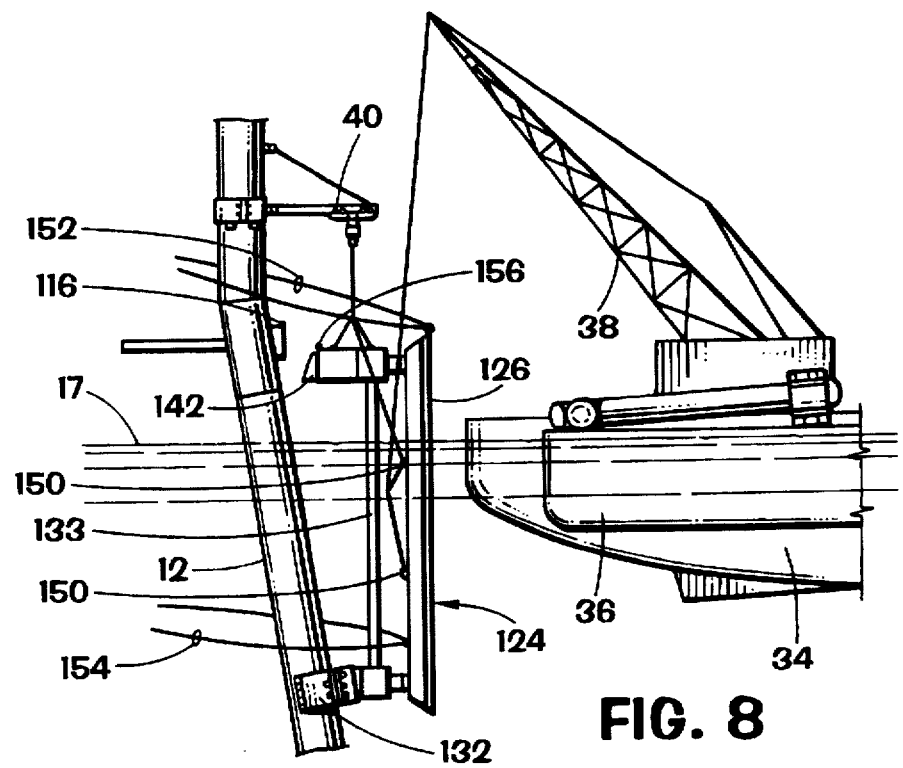
FIG. 8 illustrates a side view of the initial positioning of a new fendering system.
Figure 9:
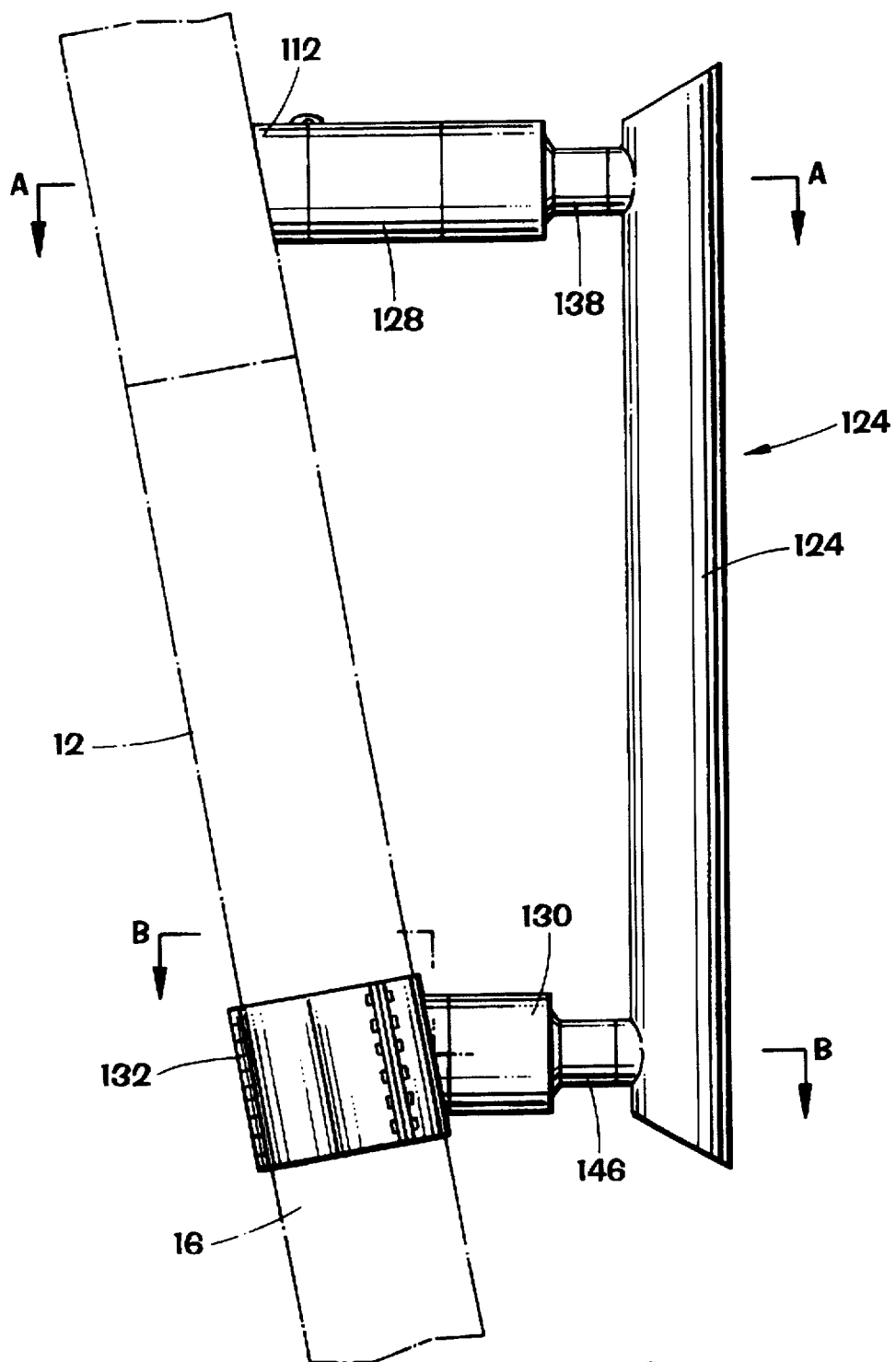
FIG. 9 illustrates a side view of a new fendering system installed on a platform leg.

Referring now to FIGS. 8 and 9, following preparation of the stub 112, a new fendering system 124 is readied for installation. The new fendering system 124 is structurally similar to the existing fendering system 10 in that it includes a vertically disposed bumper 126 that has an upper load cell 128 coupled to its upper end and a lower load cell 130 coupled to its lower end. As discussed more fully below, the upper load cell 128 is adapted to be coupled to the stub 112, and the lower load cell 130 is adapted to be coupled directly to the lower section 16 of the leg 12 by a three piece bolt clamp 132.

Because the upper and lower load cells 128 and 130 contain an elastomeric joint, there is the possibility that the upper and lower load cells may deflect downwards prior to coupling to the stub 112 and leg 12. This deflection may cause the misalignment of the load cells 128 and 130. To obviate the potential difficulty, a vertically disposed elongated stabilizer 133 is coupled to the lower side of the upper load cell 128 and the upper side of the lower load cell 130. Alternatively, the upper load cell 128 may be stabilized prior to coupling by one or more angularly disposed elongated members (not shown) that are coupled to the lower side of the upper load cell 128 and to the bumper 126. Similarly, the lower load cell 130 may be stabilized prior to coupling by one or more angularly disposed elongated members (not shown) that are coupled to the upper side of the lower load cell 130 and to the bumper 126.

The exterior of all components of the new fendering system 124 are preferably coated with an epoxy coating system, such as the epoxy high system, manufactured by Ameron Protective Coatings, Inc.

Figure 10:
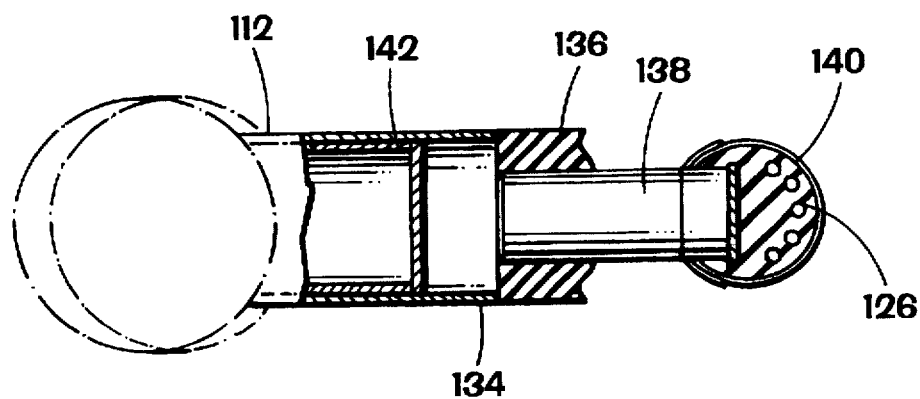
FIG. 10 illustrates a sectional view of FIG. 9, taken at section A—A.

The detailed structure of the upper load cell 128 may be understand by reference to FIG. 10, which is a sectional view of the new fendering system 124 taken at section A—A. The upper load cell 128 includes a generally cylindrical housing 134 that encases an annularly shaped elastomeric member 136, the exterior of which is bonded to the interior of the cylindrical housing 134. A generally cylindrical plunger 138 is bonded at one end to the annular elastomeric member 136 and at its other end to a generally cylindrical elongated elastomeric member 140 disposed within the bumper 126. A bevelled annular attachment guide 142 is weld or otherwise coupled to the cylindrical housing 134. The bevelled annular attachment guide 142 is preferably formed from a portion of cylindrical pipe of a diameter slightly smaller than the interior diameter of the cylindrical housing 134 that is cut at an angle, not unlike the end of a hypodermic needle. The bevelled annular attachment guide 142 is coupled to the cylindrical housing 134 so that the bevelled end protrudes therefrom a sufficient amount to slide easily into the stub 112 to facilitate coupling between the upper load cell 128 and the stub 112. The precise angular orientation of the bevelled annular attachment guide 142 is not critical.

Figure 11:
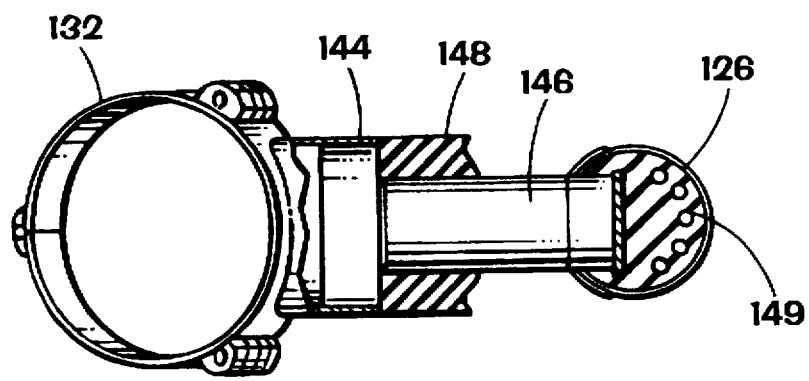
FIG. 11 illustrates a sectional of FIG. 9, taken at section B—B.

The structure of the lower load cell 130 may be understood by reference to FIG. 11, which is a sectional view of FIG. 9 taken at section B—B. The lower load cell 130 includes a cylindrical housing 144 that is coupled at one end to the three piece clamp 132 and at its other end to a plunger 146 by an annular elastomeric member 148 that is encased within and bonded to the interior of the cylindrical housing 144. The plunger 146 is journaled through, and bonded to, the annular elastomeric member 148. The other end of the plunger 146 is bonded to another elastomeric member 149 that is substantially identical to the elastomeric member 140.

After the new fendering system 124 and the stub 112 have been prepared for installation, the new fendering system is coupled to the jib crane 40 at the upper load cell 128 and to the support vessel crane 38 at the contact points 150. The jib crane 40 and the support vessel crane 38 are both lowered to lower the new fendering system 124 into the water. Once the new fendering system 124 is partially submerged, the support vessel crane 38 is detached from the contact points 150. The hoist 54 on the jib crane 40 then raises the new fendering system 124. Lateral adjustments to the new fendering system 124 may be made via tag lines 152 and 154, which are coupled to the bumper 126. The support vessel crane 138 may be used to aid azimuth positioning of the bumper 126. The hoist 54 on the jib crane 40 lifts the new fendering system 124 until the bevelled annular attachment guide 142 assumes a position that is nearly concentric with the stub 112. When a relatively concentric alignment is achieved, the jib crane 40 is moved laterally to stab the bevelled annular attachment guide 142 into the stub 112. The bevelled character of the bevelled annular attachment guide 142 combined with the circular tapered surface 120 on the stub 112 facilitates the stabbing movement. When the stabbing movement is complete, the end surfaces of the stub 112 and the cylindrical housing 134 should abut. After the stabbing movement, the flange 116 on the stub 112 should align with a substantially identical matching flange 156 on the cylindrical housing such that a pin 158 may be passed through both to temporarily secure the upper load cell 128 to the stub 112.

Figure 12:
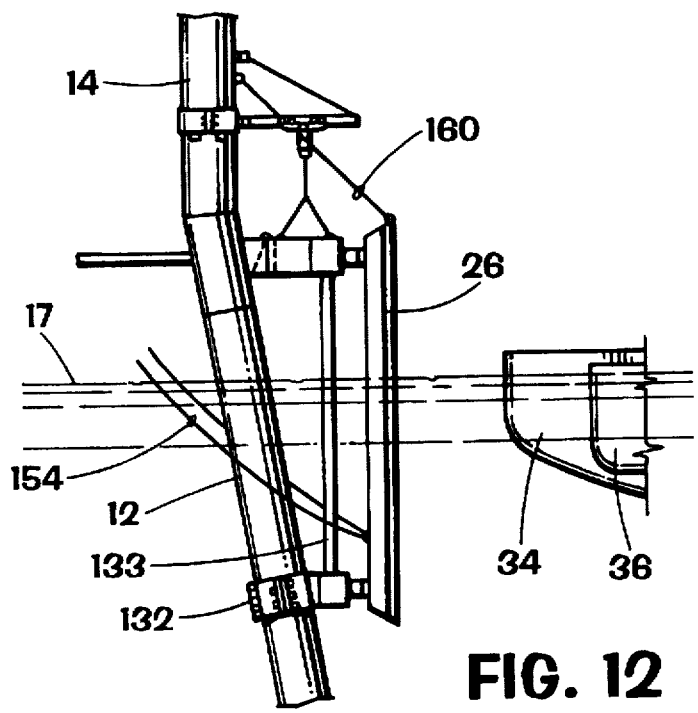
FIG. 12 illustrates a side view of the coupling of the upper and lower load cells of the new fendering system to the platform leg.

Referring now also to FIG. 12, which illustrates the final securing of the new fendering system 124, after the pin 158 has been inserted, the tag line 154 is tensioned to draw the bolted clamp 132 into contact with the lower section 16. The three piece clamp 132 may then be clamped around the lower section 16 and securely bolted into position.

Figure 13:
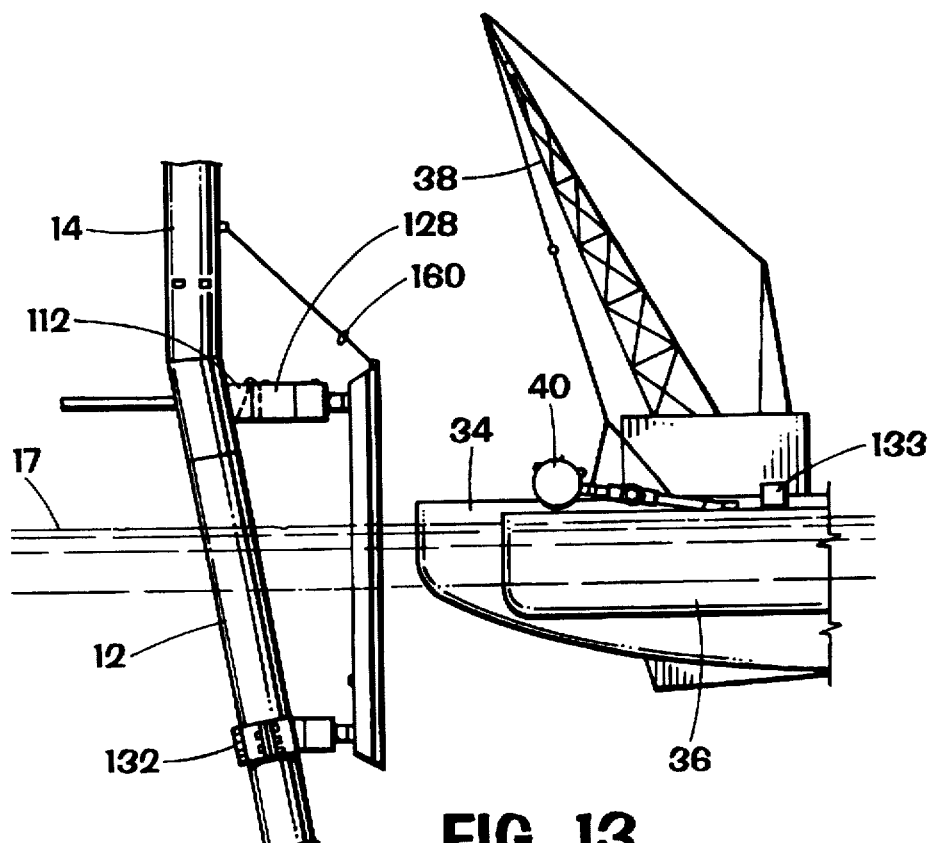
FIG. 13 illustrates a side view of completed installation of the new fendering system.

After the lower load cell 130 is clamped to the lower section 16, a support chain 160 is coupled to the upper section 14 and the upper end of the bumper 26. The upper load cell 128 is then welded or otherwise permanently coupled to the stub 112. The stabilizer 133 is removed. The installation of the new fendering system 124 is now complete. The jib crane 40 is uncoupled from the upper load cell 128 and removed from the upper section 14 by reversing the steps described above for its installation. By means of the support vessel crane 38, the jib crane 40 and the stabilizer 133 are returned to the support barge 36 as shown in FIG. 13.

Although a particular detailed embodiment of the apparatus has been described herein, it should be understood that the invention is not restricted to the details of the preferred embodiment, and many changes in design, configuration, and dimensions are possible without departing from the spirit and scope of the invention. For example, jib crane may be left on the leg 12 following installation of the new fender system 124.

We claim:

1. A method of replacing an existing fendering system on a leg of an offshore platform with the assistance of a support vessel having a crane, comprising the steps of:

coupling a jib crane to said leg above said existing fendering system;

detaching a first upper load cell of said existing fendering system from said leg, said first upper load cell being attached to said leg at a first preselected position;

detaching a first lower load cell of said existing fendering system from said leg, said first lower load cell being attached to said leg at a second preselected position;

by means of said crane, removing said existing fendering system;

by means of said crane, placing a new fendering system proximate said leg, said new fendering system comprising an elongated cylindrical bumper, a second upper load cell coupled to said bumper, and a second lower load cell coupled to said bumper in spaced relation to said second upper load cell;

by means of said jib crane, raising said new fendering system to position said second upper load cell at said first preselected position and to position said second lower load cell at said second preselected position; and coupling said second upper load cell and said second lower load cell to said leg.

2. A jib crane adapted to be coupled to a leg of an offshore platform for replacement or maintenance of an existing fendering system, comprising:

a boom having a pivoting coupling for coupling said boom to said leg such that said boom is operable to selectively pivot generally horizontally; and a hoist rollably coupled to said boom, said hoist having a vertically moveable hook being operable to lift objects, said hoist being operable to translate along said boom.

3. The jib crane of claim 2, wherein said boom is generally horizontally disposed such that said boom is operable to pivot in a horizontal plane.

4. The jib crane of claim 2, wherein said boom includes:

an inboard end;

a cantilever member pivotally coupled to said inboard end by said pivoting coupling; and a cylindrical clamp coupled to said cantilever member and being adapted to couple to said leg.

5. A method of replacing an existing fendering system on a leg of an offshore platform, comprising the steps of:

removing said existing fendering system; and coupling an integrally fabricated new fendering system to said leg, said new fendering system comprising an elongated cylindrical bumper, a replacement upper load cell coupled to said bumper, and a replacement lower load cell coupled to said bumper in spaced relation to said replacement upper load cell.

6. A method of replacing an existing fendering system on a leg of an offshore platform, comprising the steps of:

removing said existing fendering system; and coupling an integrally fabricated new fendering system to said leg, said new fendering system comprising an elongated cylindrical bumper, a replacement upper load cell coupled to said bumper, and a replacement lower load cell coupled to said bumper in spaced relation to said replacement upper load cell;

wherein said step of removing said existing fendering system includes the steps of:

detaching a first upper load cell of said existing fendering system from said leg, said first upper load cell of said existing fendering system being attached to said leg at a first preselected position; and detaching a first lower load cell of said existing fendering system from said leg, said first lower load cell of said existing fendering system being attached to said leg at a second preselected position.

7. The method of claim 6, wherein said step of coupling includes the steps of:

raising said new fendering system to position said replacement upper load cell at said first preselected position and to position said replacement lower load cell at said second preselected position; and coupling said replacement upper load cell and said replacement lower load cell to said leg.

8. The method of claim 7, including the step of coupling a jib crane to said leg above said existing fendering system.

9. The method of claim 8, wherein said step of raising is accomplished by means of said jib crane.

10. A method of replacing an existing fendering system on a leg of an offshore platform, comprising the steps of:

removing said existing fendering system; and coupling an integrally fabricated new fendering system to said leg, said new fendering system comprising an elongated cylindrical bumper, a replacement upper load cell coupled to said bumper, and a replacement lower load cell coupled to said bumper in spaced relation to said replacement upper load cell;

including the step of removing an elongated stabilizer coupled between said replacement upper load cell and said replacement lower load cell.

11. A jib crane adapted to be coupled to a leg of an offshore platform for replacement or maintenance of an existing fendering system, comprising:

a boom having a pivoting coupling for coupling said boom to said leg such that said boom is operable to selectively pivot generally horizontally; and a hoist rollably coupled to said boom, said hoist having a vertically moveable hook being operable to lift objects, said hoist being operable to translate along said boom;

wherein said boom includes:
an inboard end;
a cantilever member pivotally coupled to said inboard end by said pivoting coupling; and
a cylindrical clamp coupled to said cantilever member and being adapted to couple to said leg;
wherein said pivoting coupling includes a tongue and fork connection.

12. A jib crane adapted to be coupled to a leg of an offshore platform for replacement or maintenance of an existing fendering system, comprising:
a boom having a pivoting coupling for coupling said boom to said leg such that said boom is operable to selectively pivot generally horizontally; and
a hoist rollably coupled to said boom, said hoist having a vertically moveable hook being operable to lift objects, said hoist being operable to translate along said boom;
wherein said boom includes:
an inboard end;
a cantilever member pivotally coupled to said inboard end by said pivoting coupling; and
a cylindrical clamp coupled to said cantilever member and being adapted to couple to said leg;
which includes a locking pin coupled to said boom to prevent pivoting movement of said boom.

13. An assembly for an offshore platform, said assembly comprising:
a leg of the offshore platform;
a fendering system on the leg of the offshore platform; and
a hoist coupled to the leg of the offshore platform above the fendering system for hoisting the fendering system during replacement or maintenance of the fendering system.

14. The assembly as claimed in claim 13, wherein the hoist is a component of a jib crane mounted to the leg of the offshore platform above the fendering system.

15. The assembly as claimed in claim 13, further including a clamp for detachably mounting the hoist to the leg of the offshore platform above the fendering system.

16. The assembly as claimed in claim 13, wherein the fendering system includes an elongated bumper, an upper load cell coupled to the bumper, a lower load cell coupled to the bumper in spaced relation to the upper load cell, and a stabilizer element mounted to the upper load cell and to the lower load cell for stabilizing relative position between the upper load cell and the lower load cell during mounting of the fendering system onto the leg of the offshore platform.

17. An assembly for an offshore platform, said assembly comprising:
a leg of the offshore platform;
a fendering system on the leg of the offshore platform; and
a rigging support coupled to the leg of the offshore platform above the fendering system for hoisting the fendering system during replacement or maintenance of the fendering system.

18. The assembly as claimed in claim 17, wherein the rigging support includes a generally horizontal boom coupled to the leg of the offshore platform above the fendering system.

19. The assembly as claimed in claim 18, wherein the rigging support further includes an inclined tension member having a first end coupled to the leg of the offshore platform above the boom, and a second end coupled to the boom at a location spaced from the leg of the offshore platform.

20. The assembly as claimed in claim 17, wherein the fendering system includes an elongated bumper, an upper load cell coupled to the bumper, a lower load cell coupled to the bumper in spaced relation to the upper load cell, and a stabilizer element mounted to the upper load cell and to the lower load cell for stabilizing relative position between the upper load cell and the lower load cell during mounting of the fendering system onto the leg of the offshore platform.

21. A fendering system comprising:
an elongated bumper,
an upper load cell coupled to the bumper;
a lower load cell coupled to the bumper in spaced relation to the upper load cell; and
a stabilizer element mounted to the upper load cell and to the lower load cell for stabilizing relative position between the upper load cell and the lower load cell.

22. A fendering system for an offshore platform, said fendering system comprising:
an elongated bumper;
an upper load cell coupled to the elongated bumper and having an upper mount for mounting to a leg of the offshore platform;
a lower load cell coupled to the elongated bumper in spaced relation to the upper load cell, and having a lower mount for mounting to the leg, of the offshore platform; and
a stabilizer element mounted to said upper mount and to said lower mount for stabilizing relative position between the upper mount and the lower mount during mounting of the fendering system onto the leg of the offshore platform.

23. The fendering system as claimed in claim 22, wherein the lower mount includes a clamp for clamping the lower load cell to the leg of the offshore platform.

24. A fendering system for an offshore platform, said fendering system comprising:
an elongated bumper;
a load cell coupled to the elongated bumper and having an upper mount for mounting to a leg of the offshore platform;
a lower mount coupled to the elongated bumper in spaced relation to the upper mount for mounting to the leg of the offshore platform; and
substantially rigid stabilizer structure mounted to the upper mount for stabilizing relative position between the upper mount and the lower mount during mounting of the fendering system onto the leg of the offshore platform.

25. A fendering system for an offshore platform, said fendering system comprising:
an elongated bumper;
an upper load cell coupled to the elongated bumper and having an upper mount for mounting to a leg of the offshore platform;
a lower load cell coupled to the elongated bumper in spaced relation to the upper load cell, and having a lower mount for mounting to the leg of the offshore platform; and
a substantially rigid elongated stabilizer element having an upper end mounted to and terminating at said upper mount and a lower end mounted to and terminating at said lower mount for stabilizing relative position between the upper mount and the lower mount during mounting of the fendering system onto the leg of the offshore platform.

* * * * *